United States Patent Office 3,125,201
Patented Mar. 17, 1964

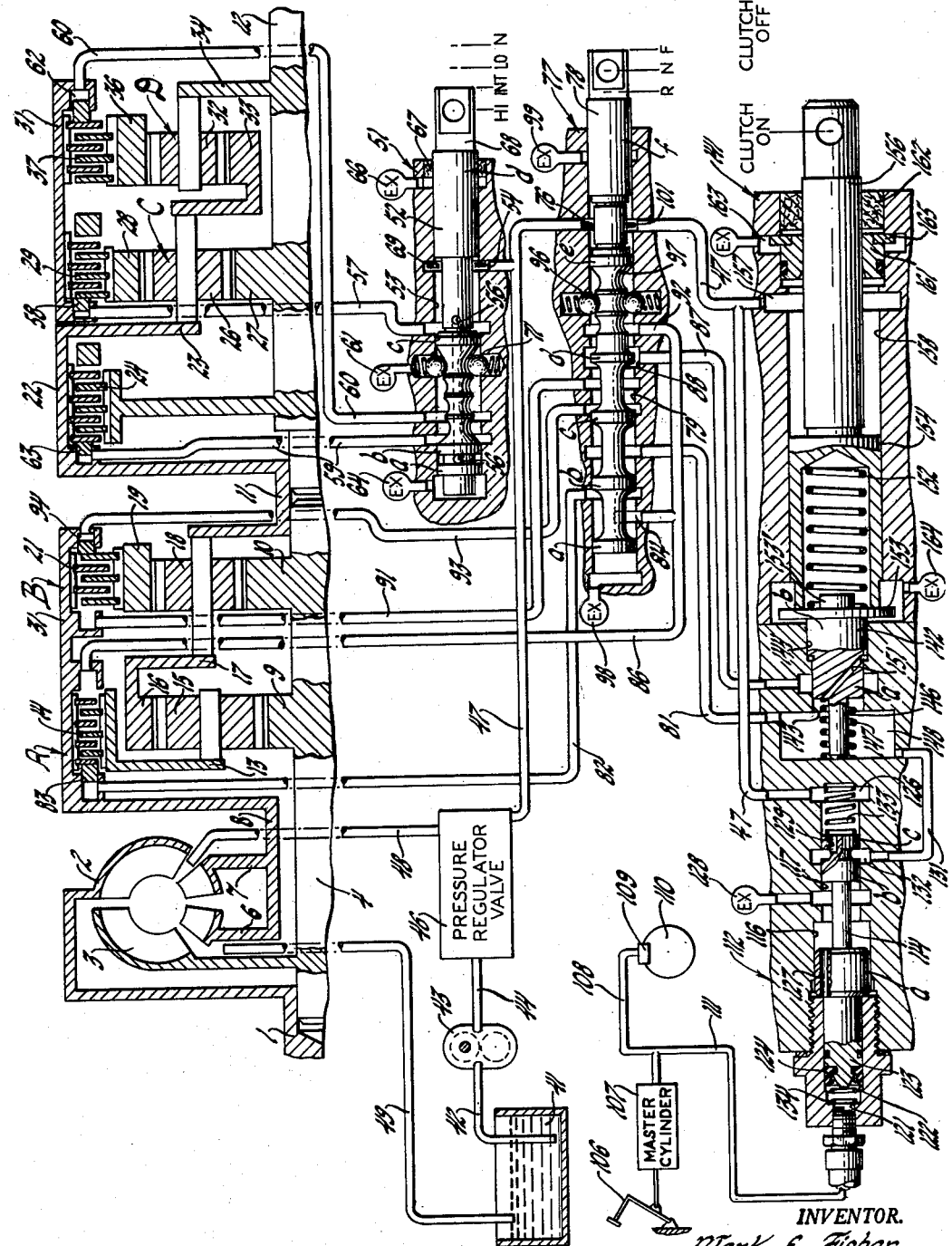

1

3,125,201
TRANSMISSION
Mark E. Fisher, Carmel, Ind., assignor to General Motors Corporation, Detroit, Mich., a corporation of Delaware
Filed Apr. 21, 1961, Ser. No. 104,573
12 Claims. (Cl. 192—4)

This invention relates to a transmission and particularly to transmission controls.

In semi-automatic transmissions having fluid actuated ratio engaging devices, it has been proposed to provide a control responsive to actuation of vehicle brakes to disengage the ratio drive mechanism in operation at the time. In a transmission control combination of this type it is proposed to provide, in a transmission having fluid actuated drive ratio engaging devices, a hydraulic control system including a source of fluid under pressure and a shift control valve operative to selectively direct fluid under pressure to various ratio engaging devices to selectively engage the drives. In the line of the shift control system employed to direct fluid from the source to the ratio control valve, there is provided a valve normally transmitting a limited flow of fluid through an orifice and operative on vehicle brake application to completely cut off the supply of fluid to the ratio control valve. The pressure of the fluid supplied to the shift control valve is further regulated at a manually controlled pressure to provide any degree of ratio engagement to slip the drive or to completely disengage the drive, and the excess fluid is exhausted to the cooling system for the ratio engaging devices.

An object of the invention is to provide in a multiratio transmission a hydraulic control system for selectively engaging each of a plurality of ratios including a source of fluid under pressure, a ratio selector valve to selectively supply fluid to a plurality of ratio engaging devices, a vehicle brake actuated cutoff valve normally connecting said source to said ratio selector valve through a limited flow orifice and operative on the engagement of the vehicle brakes to block the flow completely and a manually actuated pressure regulator valve to control the supply of fluid under pressure to said ratio selector valve located between said cutoff valve orifice and said ratio selector valve to regulate the pressure at any desired value between the pressure of the source and zero.

Another object of the invention is to provide in a multiratio transmission a control system including a source of fluid under pressure in a manual selector valve for controlling the supply of fluid to said multiratio transmission to selectively engage each of a plurality of ratios and a cutoff valve located between said source and said ratio selector valve to normally supply fluid and operative when the vehicle brakes are engaged to cut off the flow of fluid, and a manually controlled pressure regulator valve to control the pressure of the fluid delivered to said selector valve, to obtain a desired degree of drive engagement.

These and other objects of the invention will be more apparent from the following description of the preferred embodiment of the invention described in the following specification and shown in the hydraulic schematic drawing of a transmission gear arrangement and hydraulic control system.

General Arrangement

Referring to the figure, an input means or input shaft 1 drives a conventional torque converter having an impeller 2 connected to the shaft 1, a turbine 3 connected to a transmission drive shaft 4 and a pair of stators 6 and 7 of known form connected to a fixed member 8 mounted on the housing 31. The drive shaft 4 transmits drive both to a front unit having a reverse drive planetary gear set A and a forward drive planetary gear set B through a sun gear 9 and a sun gear 10, respectively. Drive is then transferred to an output sleeve 11 which is input for change speed gearing that drives an output or driven shaft 12. A reaction carrier 13 adapted to be held by a servo operated reverse brake 14, grounded to fixed member 8, rotatably mounts a plurality of pinions 15 which intermesh with the sun gear 9 and a ring gear 16. The ring gear 16 is connected to an output carrier 17 of the forward drive gear set B which carrier has rotatably mounted thereon a plurality of planet pinions 18 engaging the sun gear 10 and a reaction ring gear 19 that is adapted to be held by a servo operated forward brake 21, also grounded to the fixed housing 31. When the reverse brake 14 is engaged for holding reaction carrier 13, the reverse drive gear set A will be operative to drive the ring gear 16 backwards and accordingly the output carrier 17 and sleeve 11 connected thereto in the same direction. As the carrier 17 rotates backwards, the ring gear 19 is permitted to rotate freely. On the other hand for forward drive, the ring gear 19 is held by brake 21 and the gear set B becomes a simple reduction unit so that drive is transferred by the sleeve 11 at a reduced speed ratio from the sun gear 10 to the output carrier 17.

The sleeve 11 drives a drum 22 which is operatively disposed to interconnect the output carrier 17 and an input carrier 23 for transmitting torque to a rear unit having a high speed gear set C and a low speed gear set D or, in the alternative, to transmit torque through an intermediate speed clutch 24 connected to the output shaft 12, thus bypassing gear sets C and D. The input carrier 23 for the high speed gear set C rotatably mounts a plurality of planet pinions 26 intermeshing with an output sun gear 27 and a reaction ring gear 28 adapted to be held fixed by a servo operated high speed brake 29, grounded to a stationary housing 31. A sun gear 33, the input member for the low speed gear set D, is connected to the input carrier 23 and meshes with a plurality of planet pinions 32 rotatably mounted on an output carrier 34. The planet pinions 32 in turn meshingly engage a reaction ring gear 36 adapted to be held by a servo operated low speed brake 37, coacting with the stationary housing 31.

With the low speed brake 37 engaged and either the reverse brake 14 or the forward brake 21 engaged, drive will be transmitted from the input sun gear 33 through the output carrier 34 to the output shaft 12 at a reduced speed ratio, the lowest for this transmission. The intermediate speed ratio for either forward or reverse is obtained when the intermediate clutch 24 is engaged clutching the input carrier 23 for the gear set C to the output shaft 12 to provide a direct drive through gear sets C and D. In the preferred embodiment of the invention, the high speed gear set C provides an overdrive for the high speed ratio, when the high speed brake 29 is engaged. With the carrier 23 being the input and the sun gear 27 the output, the output shaft 12 will be driven at a faster speed than the carrier 23. If an overdrive is not desired, then by correlating the gear ratios of gear sets C and B, a 1 to 1 speed ratio can be obtained. The final speed ratio in each of the above cases will be affected by the speed ratio through gear set A or B, whichever is operative.

It can now be seen that three-speed ratios can be obtained from the two gear sets C and D by engaging and disengaging the clutch 24 and the brakes 29 and 37 which together with the reverse drive gear set A and forward drive gear set B provide three-speed ratios both in a forward and a reverse direction of the output shaft 12.

Control System

The lower portion of the transmission housing 31 provides a fluid sump 41 connected via inlet line 42 to an input driven gear pump 43 which supplies fluid via pump outlet line 44 to the main pressure regulator valve 46. The pressure regulator valve which supplies fluid at a regulated pressure to the main line 47 and to the converter supply line 48 may be constructed as shown in the application S.N. 551,068, now Patent Number 3,033,333, filed December 5, 1955, by Ulysses A. Breting and Robert M. Tuck. The converter outlet line 49 returns fluid from the torque converter to the sump 41.

Main line 47 supplies main line pressure to the rear unit selector valve 51 which has a valve element 52 having lands $a$, $b$, $c$ and $d$ of equal diameter located in a bore 53. The valve element 52 is illustrated in the high position HI and may be moved to the intermediate position INT and low position LO and neutral position N. In all positions, the main line 47 is connected by port 54 to the space between the lands $c$ and $d$ and by the passage 56 extending through the valve element 52 to the space between the lands $a$ and $b$. In the high position shown, valve 51 connects main line port 54 between the lands $c$ and $d$ to the high ratio line 57 which is connected to actuate the high motor 58 to operate the high ratio brake 29. The low ratio line 60 is connected to actuate the low ratio motor 62 which engages a low ratio brake 37 while the intermediate ratio line 59 is connected to intermediate ratio motor 63 to actuate the intermediate clutch 22. In the intermediate and low positions respectively of valve element 52, the main line 47 is connected via port 54 and the passage 56 through the valve element to the space between lands $a$ and $b$, respectively, to intermediate line 59 and low line 60 to engage the intermediate clutch 24 or low brake 37. In high and intermediate the low ratio line 60 is connected to exhaust 61. In low, intermediate is connected to exhaust 64, while in high it is connected to exhaust 61. In both intermediate and low, high ratio line 57 is connected to exhaust 61. Exhaust 64 prevents accumulation of fluid in the end of valve bore 53 interfering with the movement of valve element 52. Exhaust 66 prevents leakage past the seal 67 along the actuating stem 68 of valve element 52. The C-shaped washer 69 seated in the annular port 54 engages lands $c$ and $d$ of valve element 52 to limit movement of the valve element. A spring detent 71 locates and indicates to the operator when the valve is in the high, intermediate, low and neutral positions.

The main line is also connected to the supply port 76 of the front unit selector valve 77 which has a valve element 78 having lands $a$, $b$, $c$, $d$, $e$ and $f$ of equal diameter located in a bore 79. The main line 47 at port 76 is merely connected through the valve in all positions. In the neutral position N, shown, the forward and reverse feed line 81 is connected to the valve bore and blocked between the lands $b$ and $c$. The reverse ratio line 82, which is connected to the reverse motor 83, is connected between the lands $a$ and $b$ to the port 84 of the reverse lubrication line 86. The lubrication feed line 87 is connected to a wide port 88 extending on both sides of the land $d$ to supply fluid to the space between the lands $c$ and $e$ to the forward lubrication line 91 and a branch 92 of the reverse lubrication line 86. Since both the forward and reverse lubrication lines 86 and 91 merely discharge fluid so it flows over the plates of the forward and reverse brakes respectively, these passages in effect constitute an exhaust and no pressure is supplied to the forward ratio line 93 and reverse ratio line 82 so forward and reverse are disengaged.

When fluid is supplied to the forward ratio line 93 or the reverse ratio line 82 to supply fluid to the forward ratio motor 94 or the reverse ratio motor 83, the forward ratio brake 21 or the reverse brake 14 are engaged. When the valve element 78 is moved to the forward position F, the spring loaded detent balls 96 move over a notch in the cooperating grooves 97 and the forward and reverse ratio feed line 81 is connected between lands $b$ and $c$ to forward ratio line 93 to forward motor 94 to engage forward drive. The lubrication feed line 87 is also connected to the forward lubrication line 91 and disconnected from the reverse lubrication line 92. The reverse ratio line 82 is connected to the reverse lubrication line 86 which acts as an exhaust. When valve 78 is moved to the reverse position R, feed line 81 is connected to reverse line 82 to engage reverse and lubrication feed line 87 is connected to reverse lubrication branch 92 and line 86. The forward line 93 is exhausted to forward lubrication line 91. The exhaust 98 prevents entrapment of fluid at the end of bore 79 adjacent land $a$ while the exhaust 99 prevents leakage of fluid along the control stem portion of valve element 78. A C-shaped washer spring 101, located in annular port 76, coacts with lands $e$ and $f$ to limit valve movement.

The vehicle brake system which includes a conventional brake pedal 106 actuating a master cylinder 107 to supply brake fluid under pressure via line 108 to the wheel cylinder 109 of the conventional brake 110 also supplies brake fluid under pressure via a branch line 111 to the brake actuated cutoff valve 112. The cutoff valve 112 has a valve element 114 which has a large land $a$ located in a large bore 116 and smaller lands $b$ and $c$ located in small bore 117. Branch 111 of the hydraulic brake line may be connected through an orifice 121 to a cylinder 122 to act on the piston 123 which engages valve element 114 to bias it to the right. A cup seal 124 snaps over a headed fastener on the piston to hold the seal in position on the piston face. The orifice 121 will maintain a pressure in bore 122 to hold the cup seal 124 in place. This is particularly desirable when the cup seal is not secured to the piston 123. The orifice 121 will also delay drive disengagement with respect to brake engagement and delay drive re-engagement with respect to brake disengagement. Main line 47 is connected to the opposite end of the valve bore at port 126 located in bore 117 to act on the end face of land $c$ to bias the valve in the opposite direction opposing the hydraulic brake fluid biasing force. The exhaust passage 127 in land $a$ prevents the entrapment of leakage fluid between the piston 123 and land $a$, and the exhaust 128 prevents the entrapment of leakage fluid between the lands $a$ and $b$.

When the brakes are not engaged, fluid at main line pressure delivered by line 47 to port 126 acts upon the end land $c$ to bias the valve to the open position shown, and fluid passes through the orifice 129 to the forward and reverse supply lines 131 and 81. When the brakes are applied and sufficient pressure in the hydraulic brake line acts on the piston 123 to overcome the main line pressure acting on valve 114, the piston valve element moves to the right so that land $b$ blocks the outlet port 132 to supply line 131. Springs 133 and 134 may be located at opposite ends of the valve to vary the relationship of the hydraulic brake pressure value required as compared to main line pressure required to move the valve from the open position shown to the closed position in which it cuts off the supply of main line fluid to the front unit or forward and reverse unit selector valve 77 and thus disengages either the forward or reverse drive, depending on which is engaged in the front unit to place the transmission in neutral.

The inching control valve or clutch pressure regulator valve 141 has a valve element 142 having small land $a$ in the small bore 143, and a large land $b$ in the large bore 144. Valve element 142 has stop pin 146 surrounded by a spring 147 biasing the valve in the right direction. The supply line 131 supplies main line pressure through the valve port 148 to the forward and reverse feed line 81. The fluid in port 148 acts on the end face of land $a$ and also is conducted via restricted passage 151 to act on the unbalanced area between lands $a$ and $b$ to provide a damping action for this valve. When the fluid force is acting on valve element 142 with the biasing force of spring 147 against the force of the main biasing spring 152, valve element 142 moves between the closed and the open position to regulate the pressure. In the open position fluid is exhausted from port 148 to the lubrication feed line 87. The biasing spring 152 engages an abutment washer 153 located on the stem 153' on the end of valve element 142 and an adjustable piston abutment member 154 which has a manual control stem 156 extending out of the valve body so that it may be moved from the clutch on to the clutch off position, as shown. The main line pressure is conducted via port 157 to act on the end of the piston abutment member 154 to normally hold it in the clutch on position so that the abutment member 154 engages abutment washer 153 to positively hold the valve element 142 in the closed position in which it does not regulate the pressure in the forward and reverse feed line 81. However the abutment may be manually moved from the clutch on position to the clutch off position to gradually reduce the biasing force of spring 152 and thus regulate the main line pressure supplied to the forward and reverse feed line at lower pressure values. This can be done without reducing the pressure in main line 47 supplied to the friction engaging drive devices of the rear unit by rear unit selector valve 51 since the orifice 129 in the cutoff valve prevents a pressure drop in line 47.

The element 154 operates as a piston in bore 158 which is sealed at the stem end of the valve by a pair of seals 161 and 162 with an exhaust port 163 between them to prevent leakage of fluid along the valve stem. The C or U-shaped washer 165 located in exhaust port 163 and seal 161 limit outward movement of abutment member 154. The C-washers 69, 101 and 165 are preferably sufficiently narrower than the associated ports so that the flow area is larger than the connected line so flow is not restricted. Exhaust 164 is provided between the valve element 142 and the control element 154 to prevent the trapped fluid interfering with the operation of the valve. It will thus be seen that when the brakes are applied to a predetermined degree that the flow of operating pressure to the front unit manual selector valve 77 and the brakes or drive devices controlled thereby is blocked and the brake are either disengaged or engagement is prevented. When the brakes are disengaged, a degree of engagement of the drive devices to provide a variable degree of slip for inching a heavy vehicle may be provided by reducing the pressure of the fluid supplied to the forward and reverse brakes by moving the inching valve from the clutch on position partially toward the clutch off position. When abutment member 154 is moved to the right, the force of spring 152 acting on valve 142 is reduced, permitting a lower pressure to move the valve to the regulating position. In the clutch off position, spring 147 overcomes spring 152 and holds the valve in the open position. It will be seen that as this pressure is reduced to slip the forward and reverse brakes, the excess fluid exhausted to regulate the pressure is connected directly to lubricate and cool the brake being slipped.

The above described preferred embodiment is illustrative of the invention which it will be appreciated may be modified within the scope of the appended claims.

I claim:

1. In a transmission; a multiratio drive train having a plurality of fluid operated friction engaging drive devices; a source of fluid under pressure; a selector valve having an operating supply port and operable to selectively connect said operating supply port to each of said plurality of friction engaging drive devices; passage means operatively connecting said source of fluid under pressure to said operating supply port; and a regulator valve operative to regulate the pressure of the operating fluid supplied by said source of fluid pressure to said fluid operating supply port including a valve element having an area acted on by the fluid in said passage means and movable from a closed position by said fluid to an exhaust position exhausting said passage means, biasing means engaging said valve element and abutment means engaging said biasing means, said abutment means movable from a minimum biasing force position through increasing biasing force positions to a position engaging said valve element to hold the valve element in said closed position in response to fluid pressure supplied by said source.

2. In a transmission, a multiratio drive train having a plurality of fluid operated friction engaging drive devices, a source of fluid under pressure, a selector valve having an operating supply port and operable to a plurality of positions to selectively connect said operating supply port to each of said plurality of friction engaging drive devices and having a lubrication supply port and operable in each of the positions to connect said lubrication supply port to lubricate the engaged friction engaging drive device being engaged, first passage means operatively connecting said source of fluid under pressure to said operating supply port, a regulator valve device operative to regulate the pressure of the fluid supplied by said source to said operating supply port, said regulator valve including a valve element having an area acted on by the fluid in said first passage means and movable from a closed position by said fluid to an exhaust position exhausting said first passage means, second passage means connecting the fluid exhausted to said lubrication supply port, and variable rate biasing means biasing said valve element and being manually maneuverable relative to said valve element from a position effecting a minimum biasing force at which the fluid pressure supplied to said operating supply port is regulated at a minimum value through increasing biasing force positions to a maximum biasing force position at which the fluid pressure supplied to said operating supply port is regulated at a maximum value.

3. In a transmission, a multiratio drive train having a plurality of fluid operated friction engaging drive devices, a source of fluid under pressure, a selector valve having an operating supply port and operable to a plurality of positions to selectively connect said operating supply port to each of said plurality of friction engaging drive devices and having a lubrication supply port and operable in each of the positions to connect said lubrication supply port to lubricate the engaged friction engaging device being engaged, a brake system providing a brake apply pressure, cut off valve means, first passage means connecting said brake apply pressure to said cutoff valve means, said cutoff valve means operatively connecting said source of fluid pressure to said operating supply port in a normal position and operative in response to an increase in the brake apply pressure to a predetermined value to cut off the supply of fluid pressure from said source to said operating supply port, and manually controlled means operative to control the pressure of the operating fluid supplied by said cutoff valve to said operating supply port, said manually controlled means including a valve element having an area acted on by the operating fluid supplied by said cutoff valve and movable from a closed position by said operating fluid to an exhaust position exhausting said operating fluid, second passage means connecting the fluid exhausted to said lubrication supply port, and variable rate biasing means biasing said valve element, said biasing means being manually maneuverable relative to said valve element from a position effecting a minimum biasing force at which the fluid pressure supplied to said operating supply port is regulated at a minimum value through increasing biasing force positions to a maximum biasing force position at which the fluid pressure supplied to said operating supply port is regulated at a maximum value.

4. In a transmission, a multiratio drive train having a plurality of fluid operated friction engaging drive devices, a source of fluid under pressure, a manual selector valve having an operating supply port and operable to a plurality of positions to selectively connect said operating supply port to each of said plurality of friction engaging drive devices and having a lubrication supply port and operable in each of the positions to connect said lubrication supply port to lubricate the friction engaging drive device being engaged, a brake system providing a brake apply pressure, cutoff valve means, first passage means connecting said brake apply pressure to said cutoff valve means, said cutoff valve means including a valve member having a pair of lands, an annular fluid port located between said lands, said valve element having an orifice for connecting said source of fluid pressure to said annular fluid port when said valve member is in a normal position, said valve member operative in response to an increase in the brake apply pressure to a predetermined value to block off the supply of fluid from said source to said annular fluid port, second passage means connecting said annular fluid port to said operating supply port, a regulator valve operative to regulate the pressure of the operating fluid supplied by said annular fluid port including a valve element having an area acted on by said operating fluid and movable from a closed position by said operating fluid to an exhaust position exhausting said operating fluid, third passage means connecting the fluid exhausted to said lubrication supply port and variable rate biasing means biasing said valve element and being manually maneuverable relative to said valve element from a position effecting a minimum biasing force at which the fluid pressure supplied to said operating supply port is regulated at a minimum value through increasing biasing force positions to a maximum biasing force position at which the fluid pressure supplied to said operating supply port is regulated at a maximum value.

5. In a transmission, a multiratio drive train having a front and a rear unit each having a plurality of fluid operated friction engaging drive devices, a source of fluid under pressure, first selector valve means having an operating supply port and operable to a plurality of positions to selectively connect said operating supply port to each of said plurality of friction engaging drive devices of one unit and having a lubrication supply port and operable in each of the positions to connect said lubrication supply port to lubricate the engaged friction engaging drive device being engaged in said one unit, second selector valve means selectively operable to connect said source to each of said fluid operated friction engaging drive devices of the other unit, a brake system providing a brake apply pressure, first passage means operatively connecting said source of fluid pressure to said operating supply port, a cutoff valve, second passage means connecting said brake apply pressure to said cutoff valve, said cutoff valve being positioned in said first passage means, the cutoff valve providing a restriction in a normal position and operative in response to an increase in the brake apply pressure to a predetermined value to cut off the supply of fluid pressure from said source to said operating supply port and manually controlled means operative to control the pressure of the operating fluid supplied by said cutoff valve to said fluid operating supply port, said manually controlled means including a valve element having an area acted on by the fluid in said first passage means and movable from a closed position by said fluid to an exhaust position exhausting the fluid from said first passage means, third passage means connecting the fluid exhausted to said lubrication supply port, and variable rate biasing means biasing said valve element and being manually maneuverable relative to said valve element from a position effecting a minimum biasing force at which the fluid pressure supplied to said operating supply port is regulated at a minimum value through increasing biasing force positions to a maximum biasing force position at which the fluid pressure supplied to said operating supply port is regulated at a maximum value.

6. In a transmission, a multiratio drive train having a plurality of fluid operated friction engaging drive devices, a source of fluid under pressure, a selector valve having an operating supply port and operable to selectively connect said operating supply port to each of said plurality of friction engaging drive devices, passage means operatively connecting said source of fluid pressure to said operating supply port and manually controlled means operative to regulate the pressure of the operating fluid supplied by said passage means to said fluid operating supply port, said manually controlled means including a valve element having an area acted on by the fluid in said passage means and movable from a closed position by said fluid to an exhaust position exhausting the fluid from said passage means and variable rate biasing means biasing said valve element and being manually maneuverable relative to said valve element from a position effecting a minimum biasing force at which the fluid pressure supplied to said operating supply port is regulated at a minimum value through increasing biasing force positions to a maximum biasing force position at which the fluid pressure supplied to the operating supply port is regulated at a maximum value.

7. In a transmission, a multiratio drive train having a plurality of fluid operated friction engaging drive devices, a source of fluid under pressure, a selector valve having an operating supply port and operable to a plurality of positions to selectively connect said operating supply port to each of said plurality of friction engaging drive devices, a brake system providing a brake apply pressure, cutoff valve means, first passage means connecting said brake apply pressure to said cutoff valve means, said cutoff valve means operatively connecting said source of fluid pressure to said operating supply port in a normal position and operative in response to an increase in the brake apply pressure to cut off the supply of fluid pressure from said source to said operating supply port and manually controlled means operative to control the pressure of the operating fluid supplied by said cutoff valve to said fluid operating supply port, said manually controlled means including a valve element having an area acted on by the pressure of the operating fluid supplied by said cutoff valve and movable from a closed position by said fluid to an exhaust position exhausting the fluid supplied by said cutoff valve, biasing means engaging said valve element and abutment means engaging said biasing means, said abutment means being manually movable from a minimum biasing force position through increasing biasing force positions to a position engaging said valve element to hold the valve element in the closed position in response to fluid pressure supplied by said source.

8. In a transmission, a multiratio drive train having a plurality of fluid operated friction engaging drive devices, a source of fluid under pressure, a selector valve having an operating supply port and operable to selectively connect said operating supply port to each of said plurality of friction engaging drive devices, a brake system providing a brake apply pressure, cutoff valve means, first passage means connecting said brake apply pressure to said cutoff valve means, said cutoff valve means including a valve member having a pair of lands, an annular fluid port located between said lands and an orifice in said valve member for connecting said source of fluid pressure to said annular fluid port when said valve element is in a normal position, said valve member operative in response to an increase in the brake apply pressure to a predetermined value to cut off the supply of fluid pressure from said source to said annular fluid port, second passage means connecting said annular fluid port to said operating supply port, and manually controlled means operative to control the pressure of the operating fluid supplied by said cutoff valve means to said fluid operating supply port, said manually controlled means including a valve element having an area acted on by the operating fluid supplied by said cutoff valve means to said fluid operating supply port and movable from a closed position by said operating fluid to an exhaust position exhausting the fluid supplied by said cutoff valve means, biasing means engaging said valve element and abutment means engaging said biasing means, said abutment means being movable from a minimum biasing force position through increasing biasing force positions to a position engaging said valve element to hold the valve element in a closed position in response to fluid pressure supplied by said source.

9. In combination, a multiratio drive train having a plurality of fluid operated friction engaging drive devices; a source of fluid under pressure; a selector valve having an operating supply port and operable to selectively connect said operating supply port to each of said plurality of friction engaging drive devices; a source of fluid under pressure operatively connected to said supply port for supplying fluid thereto and valve means operative to regulate the fluid supply; said valve means including a valve element having an area acted on by the fluid from said source and movable from a closed position by said fluid to an exhaust position exhausting the fluid from said source, variable rate biasing means biasing said valve element and being manually maneuverable relative to said valve element from a position effecting a minimum biasing force at which the pressure supplied from said source to said operating supply port is regulated at a minimum value through increasing biasing force positions to a maximum biasing force position at which the fluid pressure supplied to said operating supply port is regulated at a maximum value.

10. The combination as claimed in claim 9 wherein said variable rate biasing means includes spring means engaging said valve element and abutment means engaging said spring means, said abutment means being movable from a minimum biasing force position through increasing biasing force positions to a position engaging said valve element to hold said valve element in the closed position in response to fluid pressure supplied by said source.

11. In combination, a multiratio drive train having a plurality of fluid operated friction engaging drive devices; a selector valve having an operating supply port and operable to a plurality of positions to selectively connect said operating supply port to each of said plurality of friction engaging drive devices and having a lubrication supply port and operable in each of the positions to connect said lubrication supply port to lubricate the engaged friction engaging drive device being engaged; a source of fluid under pressure; a cutoff valve; a brake system providing a brake apply pressure and manually maneuverable means operative to control a variable rate regulator valve device; first passage means connecting said brake apply pressure to said cutoff valve, said cutoff valve operatively connecting said source of fluid pressure to said operating supply port in a normal position and operative in response to an increase in the brake apply pressure to cut off the supply of fluid pressure from said source to said operating supply port, said variable rate regulator valve device including a valve element having an area acted on by the fluid supplied by said cutoff valve to said fluid operating supply port and movable from a closed position by said operating fluid to an exhaust position exhausting the fluid supplied by said cutoff valve, second passage means connecting the fluid exhausted to said lubrication supply port and variable rate biasing means biasing said valve element and being manually maneuverable relative to said valve element from a position effecting a minimum biasing force at which the fluid pressure supplied to said operating supply port is regulated at a minimum value through increasing biasing force positions to a maximum biasing force position at which the fluid pressure supplied to said operating supply port is regulated at a maximum value.

12. The combination as claimed in claim 11 wherein said variable rate biasing means includes spring means engaging said valve element and abutment means engaging said spring means, said abutment means being movable from a minimum biasing force position through increasing biasing force positions to a position engaging said valve element to hold the valve element in said closed position in response to fluid pressure supplied by said source.

References Cited in the file of this patent
UNITED STATES PATENTS

| | | |
|---|---|---|
| 1,979,488 | Perez | Nov. 6, 1934 |
| 2,309,338 | Calaway | Jan. 26, 1943 |
| 2,775,330 | Schjolin et al. | Dec. 25, 1956 |
| 2,786,368 | Cook | Mar. 26, 1957 |
| 2,788,678 | Sheppard | Apr. 16, 1957 |
| 2,883,015 | Schroeder | Apr. 21, 1959 |
| 2,917,143 | Jenney | Dec. 15, 1959 |
| 2,919,101 | Black | Dec. 29, 1959 |
| 2,922,314 | Johnson et al. | Jan. 26, 1960 |
| 2,968,967 | Ross | Jan. 24, 1961 |
| 2,972,906 | Schroeder | Feb. 28, 1961 |
| 3,016,769 | Christenson et al. | Jan. 16, 1962 |
| 3,033,333 | Breting et al. | May 8, 1962 |